Figure 1:
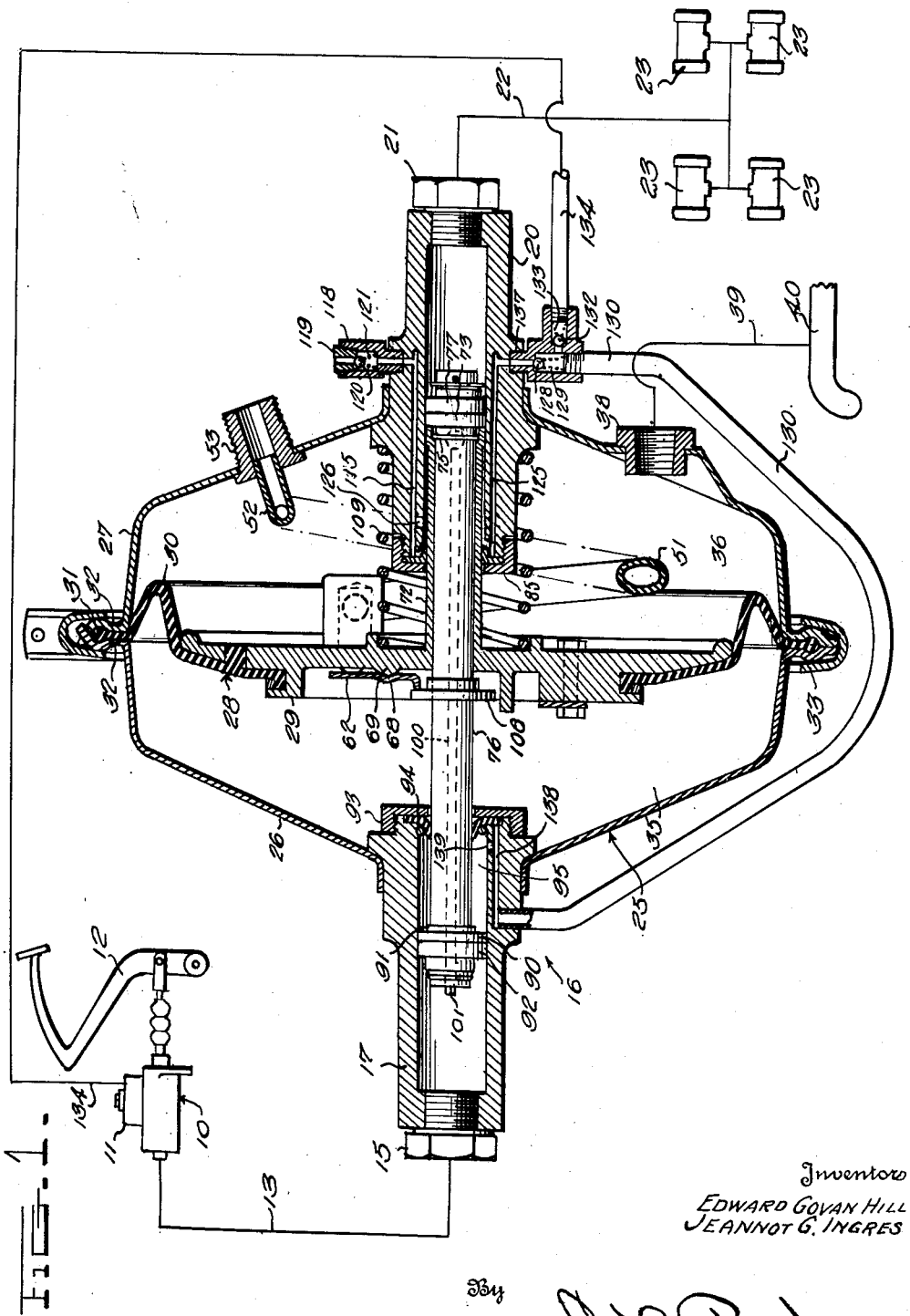

June 8, 1954

E. G. HILL ET AL 2,680,349

LEAKAGE RECOVERING MECHANISM FOR HYDRAULIC
BRAKE BOOSTER MECHANISMS

Filed Feb. 26, 1948

2 Sheets-Sheet 1

Inventors
EDWARD GOVAN HILL
JEANNOT G. INGRES

By

Attorney

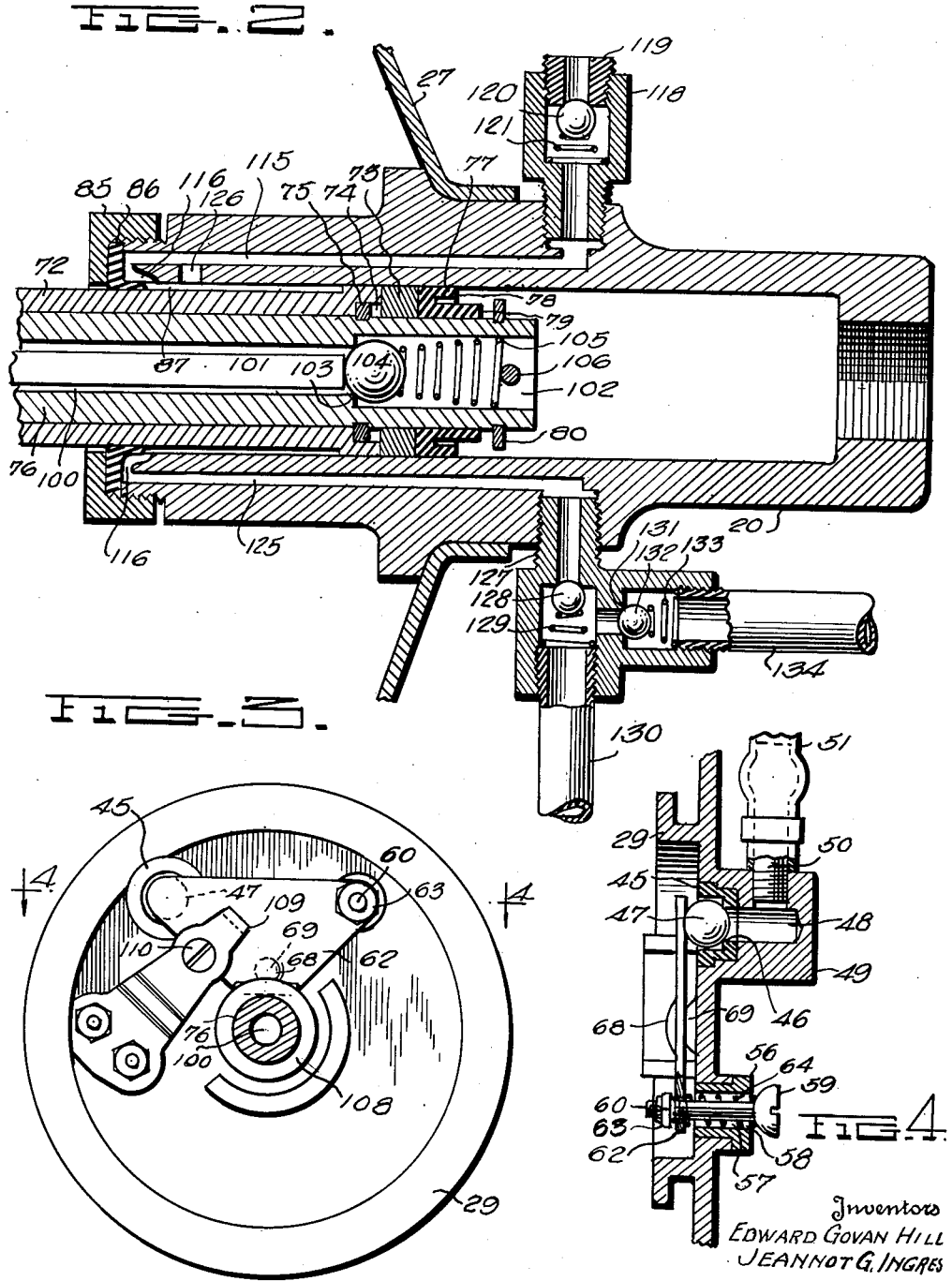

Patented June 8, 1954

2,680,349

UNITED STATES PATENT OFFICE 2,680,349

LEAKAGE RECOVERING MECHANISM FOR HYDRAULIC BRAKE BOOSTER MECHANISMS

Edward Govan Hill and Jeannot G. Ingres, Richmond, Va.; said Hill assignor to Automatic Shifters, Inc., Richmond, Va., a corporation of Virginia, and said Ingres assignor to Kelsey-Hayes Wheel Company, Detroit, Mich., a corporation of Delaware Application February 26, 1948, Serial No. 11,056

12 Claims. (Cl. 60—54.5)

This invention relates to a mechanism for collecting hydraulic leakage fluid from a hydraulic mechanism and returning it to the source of such fluid, and has particular reference to the collection of leakage fluid from a booster brake mechanism for motor vehicles and the returning of such fluid to the reservoir of the master cylinder.

A number of commercially practicable booster brake mechanisms for motor vehicles have been developed wherein a booster motor, usually vacuum operated, is energized by the displacement of hydraulic fluid from the master cylinder and creates, or assists the pedal effort in creating, a relatively high hydraulic pressure for applying the vehicle brakes. Such brake applying pressure is usually directly generated by a piston movable in a high pressure cylinder. This piston is provided with a sealing cup engageable with the walls of the cylinder to confine the hydraulic fluid in the high pressure chamber during the generation of pressure therein.

The sealing means employed are adequate to the extent that booster brake mechanisms are fully operative and highly practicable, but so far as we are aware, no perfect sealing cup has been developed. There is always some leakage past the sealing cup and this leakage fluid is lost from the system with resulting serious trouble which has caused serious accidents to occur. Most booster brake mechanisms are so constructed that upon each releasing of the brakes, the leakage fluid has been compensated for by returning to the high pressure end of the system an amount of fluid equal to that which has leaked from the high pressure end of the system. This replacement fluid is derived from the reservoir of the master cylinder and a number of instances have occurred in practice in which the reservoirs have been emptied in a comparatively short time, and in fact, in a much shorter time than ordinarily would occur. The driver receives no warning of such loss of fluid by leakage, the fluid in commercial booster brake installations finding its way into a vacuum chamber of the booster motor from which it is drawn into the intake manifold of the engine to be burned and exhausted. It has occurred, therefore, that, without his being aware that the reservoir has been drained of fluid, the operator has depressed the brake pedal with a resultant lack of brake application due to insufficient fluid in the system. Serious accidents have occurred from this cause.

Motor vehicles and booster brake manufacturers have been aware of the difficulties referred to and strenuous efforts have been made to overcome the defect. Most of these efforts have been quite naturally directed toward improvement in the sealing cups, but no perfect seal has been found, so far as we are aware. It has been proposed to drill a drain opening in the space behind the high pressure piston to drain out leakage fluid, but this is of little assistance since the hydraulic fluid is merely lost without warning to the operator. This expedient is slightly helpful in commercial booster brake mechanisms for the reason that it vents the space behind the high pressure piston to the atmosphere. This reduces differential pressures on opposite sides of the high pressure piston, the back of which is usually subjected to vacuum in the booster motor. However, the expedient referred to merely reduces leakage but does not eliminate it and does not salvage the leakage fluid.

An important object of the present invention is to provide a novel and wholly automatic mechanism which collects fluid leaking from a hydraulic system and returns it to the source of such fluid, thus preventing losses of fluid from the system regardless of the extent of the leakage past hydraulic pressure pistons.

A further object is to provide a mechanism of the character referred to which is particularly adapted for use with hydraulic booster mechanisms for motor vehicles for collecting fluid which leaks past the high pressure hydraulic piston and returns the fluid to the reservoir of the master cylinder, thus preventing loss of hydraulic fluid from the system.

A further object is to provide in combination with a hydraulic booster brake mechanism, a device for utilizing varying pressures occurring at one side of the piston which is actuated by fluid displaced from the master cylinder for withdrawing from the high pressure cylinder fluid which has leaked past the high pressure piston and for returning such fluid to the reservoir of the master cylinder.

Other objects and advantages of the invention will become apparent during the course of the following description.

In the drawings I have shown one embodiment of the invention. In this showing:

Figure 1 is an axial sectional view through a hydraulic booster mechanism showing the invention applied, the master cylinder and the wheel brake cylinder being diagrammatically represented, Figure 2 is an enlarged fragmentary sectional view of the high pressure end of the booster mechanism and associated elements, Figure 3 is a face view of a portion of the pressure-responsive member of the booster motor showing the valve operating elements associated therewith, and, Figure 4 is a detail sectional view on line 4—4 of Figure 3.

Referring to Figure 1, the numeral 10 designates the vehicle master cylinder as a whole having the usual reservoir 11 and piston (not shown) operable by a conventional brake pedal 12 to displace hydraulic fluid through a line 13 to operate the motor vehicle brakes. These elements, of course, are conventional and need not be shown in detail.

The line 13 leads through a suitable connection 15 to supply hydraulic brake fluid to a booster mechanism indicated as a whole by the numeral 16, the brake fluid being delivered into one end of a low pressure cylinder 17 forming a part of the booster mechanism. The low pressure cylinder and the elements associated therewith will be referred to later.

Through means to be described, relatively high pressure is developed in a high pressure hydraulic cylinder 20 having a suitable connection 21 leading to a pipe line 22 for delivering hydraulic fluid to the usual brake cylinders 23 to apply the brakes. The high pressure cylinder 20 and associated elements also will be referred to in detail later.

A booster motor indicated as a whole by the numeral 25 assists the operator in generating pressure in the cylinder 20. This motor comprises casing sections 26 and 27 in which is arranged a pressure-responsive member 28 comprising a rigid plate portion 29 and a flexible radially outer diaphragm portion 30 having a peripheral bead 31 arranged between flanges 32 formed on the casing sections 26 and 27. These flanges and the bead 31 are maintained in clamped relation by a split clamping band 33. The remote ends of the casing sections 26 and 27 are secured respectively to the cylinders 17 and 20 and these cylinders, in the present embodiment of the invention, are arranged in axial alinement.

The booster motor 25 in the present instance, is vacuum suspended. The casing sections 26 and 27 are divided by the pressure-responsive member 28 to form a variable pressure chamber 35 and a constant pressure vacuum chamber 36 in constant communication with a source of partial vacuum. For this purpose, the casing section 27 is provided with a nipple 38 connected by a suitable line 39 to the intake manifold 40 of the vehicle engine. The chambers 35 and 36 normally communicate with each other to vacuum suspend the pressure-responsive unit 28, and this communication is cut off and air admitted into the chamber 35 to actuate the pressure-responsive unit 28 in a manner to be described.

Referring to Figure 4, it will be noted that a suitable valve mechanism for the motor 25 is illustrated. The plate 29 is provided with a valve insert 45 having a seat 46 normally closed by a ball valve 47, thus closing communication between the chamber 35 and a recess 48 formed in a boss 49 cast integral with the plate 29. A nipple 50 is threaded into the boss 49 to connect the recess 48 to one end of a flexible hose 51, the opposite end of which is connected by an elbow 52 to a nipple 53 communicating with the atmosphere, preferably by a small air cleaner (not shown) adapted to be threaded on the nipple 53.

The plate 29 is provided with a second valve insert 56 having an axial passage 57 therethrough, one end of which forms a seat 58 engageable by a valve 59. The stem 60 of this valve extends through and beyond the opening 57 as shown in Figure 4 and projects loosely through a valve operating plate 62. A suitable nut 63 is threaded on the stem 60 and limits movement of the valve 59 from the plate 62, and a small spring 64 is arranged between the plate 62 and valve 59 to urge the latter away from the plate 62 to the extent limited by the nut 63.

The plate 62 is substantially triangular as shown in Figure 3 and the stem 60 projects through one of the upper corners of such plate. The other upper corner of the plate engages the ball 47, as shown in Figures 3 and 4.

The plate 62 is provided with a stamped recess 68 receiving a hemispherical boss 69 carried by the plate 29. This boss 69 serves as a rocking pivot for the plate 62 and permits the plate to rock on a line between the point of contact of the plate 62 with the ball 47 and boss 69 to close the valve 59. This disconnects the chambers 35 and 36, as will be apparent. Further operation of the plate 62 in a manner to be described causes it to pivot on a line between the boss 69 and the point of contact of the plate 62 with the nut 63 to relieve pressure between the plate 62 and ball 47 whereby the latter will be pushed from its seat by air pressure behind the ball 47, thus admitting air from the hose 51 and recess 48 into the chamber 35. Thus the pressure-responsive unit 29 will be subjected to differential pressures to move it to the right, as viewed in Figure 1.

The pressure-responsive unit 29 further comprises a preferably integral piston sleeve 72 which projects into the high pressure cylinder 20, as shown in Figure 1, the parts in such cylinder being shown in a partially brake-applying position, for a purpose to be described.

Referring to Figure 2, it will be noted that the sleeve 72 has its inner end abutting a ring 73 and an annular recess 74 in the end of the sleeve 72 surrounds a snap ring 75 carried by an inner coaxial tubular piston 76. A sealing cup 77 is engaged by the ring 73 and has flanges 78 and 79 respectively engaging the interior wall of the high pressure cylinder 20 and the outer surface of the tubular piston 76. A snap ring 80 prevents substantial axial displacement of the sealing cup 77.

At its inner end, the high pressure cylinder 20 is provided with an internally threaded cap 85 for clamping a sealing cup 86 in position. This cup engages the outer surface of the piston sleeve 72 to prevent leakage into the chamber 36 of any brake fluid in the space 87 behind the piston formed by the sealing cup 77 and associated elements.

In this connection, it is pointed out that most of the trouble which has been encountered with booster brake mechanisms of the present type has been due to leakage of brake fluid past sealing cups corresponding to the cup 77. Such fluid finds its way into the vacuum chamber of the booster motor, and thence into the brake manifold to be burned in the vehicle engine and discharged. The present invention is particularly directed to the overcoming of such difficulty and its attendant disadvantages, as further discussed below.

The tubular piston 76 has its left hand end as viewed in Figure 1 projecting into the low pressure cylinder 17 and terminates in a piston formed by an annular ring 90 backed up by a snap ring 91 and engaging a sealing cup 92. Leakage past the cup 92 usually is not serious since pressures developed in the low pressure cylinder 17 are much lower than pressures developed in the high pressure cylinder 20. For the purpose of the present invention, however, a cap 93 is threaded on the end of the cylinder 17 within the chamber 35 and clamps in position a sealing cup 94 engaging the tubular piston 76. Between this cup and the ring 90 is a space 95 forming a part of the interior of the low pressure cylinder, and this space is utilized in the operation of the present invention in a manner to be described.

The tubular piston 76 has an axial passage 100 extending therethrough from end to end and a rod 101 extends through this passage and is adapted to engage a portion of the fitting 15 to limit movement of the rod to the left as viewed in Figure 1. The right end of the passage 100 (Figure 2) is enlarged as at 102 to form a valve seat 103 normally engaged by a ball 104 urged to closed position by a spring 105. The outer end of this spring engages a cross pin 106. During energization of the booster, the valve 104 is closed, and when the off position is reached, the rod 101 unseats the ball 104 to open communication between the high and low pressure cylinders 17 and 20 to replace leakage fluid, as will be understood. In the application of the brakes, fluid displaced from the master cylinder moves the piston sleeve 76 toward the right, as viewed in Figure 1, and an annular flange 108 (Figure 1) engages the lower end of the valve operating plate 62 to rock this plate on the first and second axes referred to above to close the valve 59 and then release the valve 47 to be opened. This valve pivoting movement is opposed by a spring 109 (Figure 3) carried by the plate 29 and having its tension adjustable by a screw 110. This particular feature forms no part per se of the present invention, but corresponds generally to the valve mechanism disclosed in the copending application of O. M. Whitten Serial No. 605,119, filed July 14, 1945, now Patent No. 2,462,015.

The operation referred to energizes the motor 25 to move the piston sleeve 72 toward the right, this piston moving in a follow-up action relative to the tubular piston 76 whereby the booster motor cooperates with the manually operated piston sleeve 76 to generate relatively high pressures in the high pressure cylinder 20. This operation is fully disclosed in the prior patent to Rudolph J. Klimkiewicz No. 2,377,699, granted June 5, 1945, and need not be specifically referred to in connection with the operation of the present invention. When the brakes are released, the parts are returned to position by the pressure of the displaced fluid in the brake cylinders and brake lines 22, assisted by the usual return spring 109 (Figure 1).

The mechanism forming the primary subject matter of the present invention has to do with the recovery of hydraulic fluid leakage from the space 87 (Figure 2) and the returning of such fluid to the reservoir 11 to prevent the loss of such fluid. Referring to Figure 2, the wall of the cylinder 20 is provided, preferably in the top thereof when the device is in the preferred position shown, with a longitudinal air passage 115 which communicates with the space 87 adjacent the sealing cap 86 through an annular groove 116. A nipple 118 is threaded into the body of the cylinder 20 to communicate with the passage 115 and has an apertured plug 119 engaged by a ball check valve 120 urged to closed position by a very light spring 121. It will be obvious that when the pistons move to the right upon energization of the booster, substantially atmospheric pressure will be maintained in the space 87. The advantage of this will be further referred to later.

Preferably along the bottom of the cylinder 20 when the device is in the preferred position, is formed a longitudinal passage 125 communicating with the space 87 adjacent the sealing cup 86 through groove 116. The passage 125 provides for the egress of hydraulic brake fluid from the space 87 as the parts return to normal position after a brake application.

In addition to the groove 116, the space 87 preferably communicates with the passage 115 through an opening 126 (Figure 2). This opening is unnecessary when the apparatus is used in the horizontal position in Figure 1. In some installations, however, the apparatus is arranged vertically with the right hand end as viewed in Figure 2 arranged at the top. Under such conditions, hydraulic brake fluid would accumulate along the bottom of the space 87, that is, on the seal 86. In order to prevent agitation and foaming of the hydraulic fluid under such conditions, the opening 126 is provided to vent the space 87 to the passage 115 above the level of accumulated hydraulic fluid in the space 87.

The passage 125 externally of the casing section 27 communicates with the interior of a nipple 127 having an outwardly opening ball check valve 128 normally held closed by a very light spring 129. The nipple 127 is in the form of a T, one run of which communicates with the passage 125 and the other run of which is connected to one end of a pipe 130 for a purpose to be described. The branch of the T is provided with a port 131 normally closed by a ball check valve 132 normally lightly maintained on its seat by a spring 133. The branch of the T is connected to one end of a pipe line 134 leading back to the reservoir 11 to return leakage fluid thereto.

The body of the cylinder 17 is provided with a longitudinal passage 138 communicating as at 139 with the space 95 adjacent the sealing cup 94. Externally of the casing section 26, the passage 138 has its left hand end, as viewed in Figure 1, communicating with the pipe 130.

*Operation*

The booster mechanism as a whole is conventional and is constructed and operated substantially in accordance with the disclosure of the Klimkiewicz patent referred to above. The booster operation accordingly need be only briefly described. The two pistons normally occupy positions at the left hand end of their strokes with the rod 101 engaging the fitting 15 to unseat the ball 104. Upon operation of the brake pedal, fluid is displaced from the master cylinder into the low pressure cylinder 17 to move the tubular piston 76. The right hand end of this piston starts to move in the high pressure cylinder 20, and the movement of the tubular piston rocks the valve plate 62 in the manner described to energize the motor 25. The pressure responsive unit 28 then moves toward the right in a follow-up action relative to the tubular piston 76, and accordingly this piston and the piston sleeve 72 move substantially in unison to build up the desired braking pressure in the high pressure cylinder 20. Hydraulic fluid from this cylinder will be displaced under pressure to the brake cylinders to apply the brakes in the usual manner.

Much experimental work has been carried on in an effort to improve the sealing characteristics of the piston cups such as the cup 77 to seal the high pressure cylinders of booster mechanisms against leakage. These efforts have been attended with only limited success, and this leakage has been a source of difficulty with booster mechanisms of this type which are now in extensive use.

Fluid leaking past the packing cup 77 finds its way into the constant vacuum chamber 36 of the booster motor, and ultimately into the intake manifold through the line 39. This leakage fluid is burned in the motor and thus lost, and in practice it has been found that the supply of hydraulic brake fluid is depleted more rapidly than is normal for braking systems which do not include boosters. This depletion of the supply of hydraulic brake fluid in the master cylinder reservoirs has resulted in a number of serious accidents through application of the brakes with insufficient hydraulic fluid available for braking use. This situation is aggravated in conventional boosters because of the fact that relatively high pressure exists in the pressure end of the cylinder 29 while vacuum exists adjacent the opposite side of the packing cups, this vacuum being present in the motor chamber 36. The high differential pressures to which the sealing cups are subjected obviously aggravates the leakage occurring with each substantial brake application. This situation has not been cured or even remedied to any substantial extent through efforts to improve the sealing cups themselves.

The present construction completely eliminates the difficulty referred to. By providing the sealing cup 86 (Figure 2) and permitting the flow of air into the space 87 around check valve 120, it is impossible to subject the sealing cup 77 to the high differential pressures normally present in an apparatus of this character. Thus leakage is minimized by the admission of air into the space 87.

However, it is highly desirable to recover hydraulic fluid which leaks past the sealing cup 77, and this is accomplished in the present construction. With each movement of the booster parts to the right to generate pressure in the high pressure end of the apparatus, air will flow into the space 87 to vent this space and to minimize leakage past the cup 77. When the brakes are released the parts move back toward the left and air and any hydraulic brake fluid which may have leaked into the space 87 will flow through the passage 125 and will unseat the valve 128. In this connection, it will be noted that without the pipe 130, the piston parts in Figure 2 would pump practically all of the hydraulic fluid out through the passage 125. As the fluid accumulates above the ball 129 subsequent applications of the brakes and the releasing of the brakes would gradually return this fluid through line 134 to the reservoir 11.

However, to insure against any leakage past the cup 86, the pipe 130 is connected to the passage 138 which acts as a pump chamber in connection with the expansible and contractible chamber 95. Upon each releasing of the brakes, the space 95 expands, and the capacity of this space being greater than that of the space 87, a partial vacuum will be created in the space 87 to draw fluid therefrom through passage 125 and thus past the ball 128. The subsequent application of the brakes will cause contraction of the space 95 and air pumped therefrom through pipe 130 will force accumulations of brake fluid below the valve 128 to unseat the ball 132 and flow through pipe 134 back into the reservoir 11.

Accordingly, it will be apparent that the present construction not only minimizes leakage past the cup 77 by maintaining substantially atmospheric pressure in the chamber 87, but also functions to return all leakage fluid to the reservoir 11. Thus the leakage of hydraulic brake fluid from the system does not exceed normal leakage occurring with conventional systems which do not employ booster mechanisms. The prevention of the loss of hydraulic fluid from the system thus maintains an adequate supply of hydraulic fluid over long periods of time whereas in conventional systems employing boosters, leakage occurs at a far faster rate. Ordinarily, therefore, it is necessary to check the supply of fluid in the reservoir 11 quite often, otherwise the operator may find himself unable to apply the brakes because of excessive loss of brake fluid from the system.

As previously stated, the opening 126 is provided for use when the apparatus is installed in vertical position with the right hand end as viewed in Figure 1 arranged at the top. When the device is arranged in the position shown in Figure 1, hydraulic fluid in the space 87 will gravitate toward the passage 125 and may freely flow therethrough by virtue of the venting of the top of the space 87 to the atmosphere. With the apparatus arranged in vertical position, however, the leakage fluid in the space 87 will gravitate toward the groove 116. The suction created in the space 125 under such conditions will sometimes cause air from the passage 115 to mingle with and agitate the hydraulic fluid in the groove 116 and cause it to foam and somewhat interfere with the proper operation of the apparatus. It is accordingly preferred that the opening 126 be employed, in which case the passage 115 will be open to the space 87 above the level of hydraulic fluid therein, thus properly venting the space 87 for the flow of the hydraulic fluid through passage 125.

The question of hydraulic fluid leakage past the seal 99 in the low pressure end of the apparatus is less serious than that in the high pressure end. Some leakage into the space 95 will occur, however, and any such leakage fluid may flow through opening 139 through passage 138 into the pipe 130. Upon each movement of the piston 92 toward the right, such leakage fluid will be displaced into and through the pipe 130 and thus this fluid will be saved together with the fluid leaking into the space 87, to be returned to the reservoir 11.

The additional cost of the present device over conventional booster mechanisms is slight since it employs only two sections of tubing and simple relatively inexpensive check valves. The withdrawing of the leakage fluid from the space 87 and the pumping of such fluid back into the reservoir, in the present embodiment of the invention, utilizes the operation of parts of a conventional booster brake mechanism.

We claim:

1. A hydraulic booster brake system comprising a master cylinder having a reservoir, hydraulically operated wheel cylinders for applying the brakes, a low pressure cylinder having one end connected to said master cylinder, a high pressure cylinder having one end connected to said wheel cylinders, a piston sleeve in said high pressure cylinder, a tubular piston rod having a piston in said low pressure cylinder and a plunger in said piston sleeve, said tubular piston rod having an axial passage therethrough communicating between said ends of said cylinders, means for closing said axial passage upon movement of said piston away from said end of said low pressure cylinder incident to the flow of hydraulic fluid thereinto from said master cylinder, a booster motor connected to said piston sleeve, control means for energizing said motor upon said movement of said piston to actuate said piston sleeve whereby it cooperates with said plunger to generate pressure in said end of said high pressure cylinder, a seal in the other end of said low pressure cylinder surrounding said tubular piston rod whereby said other end of said low pressure cylinder becomes an expansible chamber device, a duct connecting the other end of said high pressure cylinder to said expansible chamber device, a pipe connecting said duct to said reservoir, a check valve in said duct between said pipe and said other end of said high pressure cylinder and opening away from the latter, and a check valve in said pipe opening toward said reservoir.

2. A hydraulic fluid pressure mechanism comprising a cylinder, a piston in said cylinder, means for maintaining one end of said cylinder full of hydraulic fluid and said piston being movable toward said end of said cylinder to generate pressure in said fluid, a seal in the other end of said cylinder surrounding said piston, an inwardly opening check valve connected to said other end of said cylinder inwardly of said seal for admitting air thereinto during pressure-generating movement of said piston, and an expansible chamber device having mechanical connection with said piston and operable during movement of said piston toward said other end of said cylinder for withdrawing hydraulic fluid therefrom.

3. A hydraulic fluid pressure mechanism comprising a cylinder, a piston in said cylinder, means for maintaining one end of said cylinder full of hydraulic fluid and said piston being movable toward said end of said cylinder to generate pressure in said fluid, a seal in the other end of said cylinder surrounding said piston, an inwardly opening check valve connected to said other end of said cylinder inwardly of said seal for admitting air thereinto during pressure-generating movement of said piston, a reservoir for supplying hydraulic fluid to said first named end of said cylinder, and means having mechanical connection with said piston and operative during movement of said piston toward said other end of said cylinder for withdrawing hydraulic fluid therefrom, and operative thereafter for returning such hydraulic fluid to said reservoir.

4. A hydraulic fluid pressure mechanism comprising a cylinder, a piston in said cylinder, means for maintaining one end of said cylinder full of hydraulic fluid and said piston being movable toward said end of said cylinder to generate pressure in said fluid, a seal in the other end of said cylinder surrounding said piston, an inwardly opening check valve connected to said other end of said cylinder inwardly of said seal for admitting air thereinto during pressure-generating movement of said piston, an expansible chamber device connected to and operable coincidentally with said piston, a duct connecting said expansible chamber device to said other end of said cylinder to withdraw hydraulic fluid therefrom during movement of said piston toward said other end of said cylinder, a check valve in said duct opening away from said cylinder, and a pipe connecting said duct to said reservoir and having a check valve therein opening toward said reservoir, whereby said expansible chamber device, during pressure-generating movement of said piston returns hydraulic fluid from said duct through said pipe to said reservoir.

5. A hydraulic mechanism comprising a hydraulic cylinder, a piston in said cylinder movable toward one end thereof to generate hydraulic pressure therein, sealing means in the other end of said cylinder surrounding said piston, a duct connected at one end to the space provided in said other end of said cylinder inwardly of said sealing means, and an expansible chamber device comprising a chamber and a member movable to vary the capacity thereof, such member being connected to and operative coincidentally with said piston and connected to said duct, said expansible chamber device expanding its capacity as said piston moves toward said other end of said cylinder, at a rate greater than the reduction in the capacity of said space.

6. A hydraulic mechanism comprising a hydraulic cylinder, a piston in said cylinder movable toward one end thereof to generate hydraulic pressure therein, sealing means in the other end of said cylinder surrounding said piston, a duct connected at one end to the space provided in said other end of said cylinder inwardly of said sealing means, an expansible chamber device having a chamber connected to said duct, and means having mechanical connection with said piston and operable coincidentally therewith for expanding said chamber during reduction of the capacity of said space during movement of said piston toward said other end of said cylinder, said chamber having a rate of capacity increase exceeding the rate of capacity decrease of said space.

7. A hydraulic mechanism comprising a hydraulic cylinder, a piston in said cylinder movable toward one end thereof to generate hydraulic pressure therein, sealing means in the other end of said cylinder surrounding said piston, a duct connected at one end to the space provided in said other end of said cylinder inwardly of said sealing means, an expansible chamber device having a chamber connected to said duct, means having mechanical connection with said piston and operable coincidentally therewith for expanding said chamber during reduction of the capacity of said space during movement of said piston toward said other end of said cylinder, said chamber having a rate of capacity increase exceeding the rate of capacity decrease of said space, a reservoir for supplying hydraulic fluid to said one end of said cylinder, a pipe connecting said duct to said reservoir, and check valves in said duct and said pipe, the means for expanding said chamber operating to reduce the capacity thereof during movement of said piston in pressure-generating movements thereof for returning hydraulic fluid to said reservoir through said pipe.

8. A hydraulic mechanism comprising a hydraulic cylinder, a piston in said cylinder movable toward one end thereof to generate hydraulic pressure therein, sealing means in the other end of said cylinder surrounding said piston, a fluid pressure motor at said other end of said cylinder, said motor comprising a casing section coaxial with said cylinder and further comprising a pressure responsive unit connected to said piston to effect pressure generating movement thereof, a duct connected at one end to the space provided in said other end of said cylinder between said sealing means and said piston, and an expansible chamber device comprising a chamber and a member movable to vary the capacity thereof, such member having mechanical connection with and operative coincidentally with said piston and said chamber being connected to the other end of said duct.

9. A hydraulic mechanism comprising a hydraulic cylinder, a piston in said cylinder movable toward one end thereof to generate hydraulic pressure therein, sealing means in the other end of said cylinder surrounding said piston, a fluid pressure motor at said other end of said cylinder, said motor comprising a casing section coaxial with said cylinder and further comprising a pressure responsive unit connected to said piston to effect pressure generating movement thereof, a duct connected at one end to the space provided in said other end of said cylinder between said sealing means and said piston, an expansible chamber device having a chamber connected to said duct, and means having mechanical connection with said piston and operable coincidentally therewith for expanding said chamber during reduction of the capacity of said space during movement of said piston toward said other end of said cylinder, said chamber having a rate of capacity increase exceeding the rate of capacity decrease of said space.

10. A hydraulic booster brake mechanism comprising a hydraulic cylinder, a piston in said cylinder movable toward one end thereof to generate pressure therein, a vacuum booster motor having a pressure movable element connected to said piston to move it toward said end of said cylinder upon energization of said motor, said pressure movable element dividing said motor into a pair of fluid pressure chambers one of which is adjacent the other end of said cylinder and is subject to connection with a source of vacuum, a seal in said other end of said cylinder sealing the interior of said other end of said cylinder from said one chamber, a duct communicating with the interior of said other end of said cylinder between said seal and said piston, and means for creating a relatively low pressure in said duct for withdrawing therethrough any hydraulic fluid leaking past said piston into said other end of said cylinder.

11. A hydraulic booster brake mechanism comprising a hydraulic cylinder, a piston in said cylinder movable toward one end thereof to generate pressure therein, a vacuum booster motor having a pressure movable element connected to said piston to move it toward said end of said cylinder upon energization of said motor, said pressure movable element dividing said motor into a pair of fluid pressure chambers one of which is adjacent the other end of said cylinder and is subject to connection with a source of vacuum, a seal in said other end of said cylinder sealing the interior of said other end of said cylinder from said one chamber, a duct communicating with the interior of said other end of said cylinder between said seal and said piston, and an expansible chamber device comprising a chamber connected to the other end of said duct and a member movable to expand said chamber, such member having mechanical connection with said piston to be operated coincidentally therewith to expand said last-named chamber upon movement of said piston toward said other end of said cylinder.

12. A hydraulic booster brake mechanism comprising a hydraulic cylinder, a piston in said cylinder movable toward one end thereof to generate pressure therein, a vacuum booster motor having a pressure movable element connected to said piston to move it toward said end of said cylinder upon energization of said motor, said pressure movable element dividing said motor into a pair of fluid pressure chambers one of which is adjacent the other end of said cylinder and is subject to connection with a source of vacuum, a seal in said other end of said cylinder sealing the interior of said other end of said cylinder from said one chamber, a duct communicating with the interior of said other end of said cylinder between said seal and said piston, an expansible chamber device comprising a chamber connected to the other end of said duct and a member movable to expand said chamber, such member having mechanical connections with said piston to be operated coincidentally therewith to expand said last-named chamber upon movement of said piston toward said other end of said cylinder, a check valve providing for the flow of hydraulic fluid from said other end of said cylinder into said duct, a second duct communicating with said first-named duct between said check valve and said expansible chamber device, and a check valve in said second duct opening away from said first-named duct.

References Cited in the file of this patent

UNITED STATES PATENTS

| Number | Name | Date |
|---|---|---|
| 1,617,020 | Merwin | Feb. 8, 1927 |
| 1,653,276 | Harris | Dec. 20, 1927 |
| 1,978,667 | Breese | Oct. 30, 1934 |
| 2,140,733 | Carroll | Dec. 20, 1938 |
| 2,207,226 | Schmidt | July 9, 1940 |
| 2,222,848 | La Brie | Nov. 26, 1940 |
| 2,328,637 | Freeman | Sept. 7, 1943 |
| 2,344,768 | Dodson | Mar. 21, 1944 |
| 2,438,723 | Stelzer | Mar. 30, 1948 |
| 2,504,691 | Ingres | Apr. 18, 1950 |